April 21, 1970 J. C. MOYERS 3,508,003

TELEMETERING SYSTEM WITH CONVENTIONAL TELEPHONE COMMUNICATION CHANNEL USING TIME SPACED INFORMATION PULSES

Filed July 28, 1966 4 Sheets-Sheet 1

INVENTOR
JOHN C. MOYERS
BY
Jonathan Plaut
ATTORNEY

April 21, 1970 J. C. MOYERS 3,508,003

TELEMETERING SYSTEM WITH CONVENTIONAL TELEPHONE COMMUNICATION CHANNEL USING TIME SPACED INFORMATION PULSES

Filed July 28, 1966 4 Sheets-Sheet 2

INVENTOR
JOHN C. MOYERS
BY
Jonathan Plaut
ATTORNEY

INVENTOR
JOHN C. MOYERS
BY
Jonathan Plaut
ATTORNEY

INVENTOR
BY JOHN C. MOYERS

Jonathan Plaut
ATTORNEY 3,508,003

TELEMETERING SYSTEM WITH CONVENTIONAL TELEPHONE COMMUNICATION CHANNEL USING TIME SPACED INFORMATION PULSES

John C. Moyers, Highland, Ind., assignor to Air Reduction Company, Incorporated, New York, N.Y., a corporation of New York Filed July 28, 1966, Ser. No. 568,645
Int. Cl. H04q *9/14;* G08c *19/36, 19/24*
U.S. Cl. 179—2 4 Claims

ABSTRACT OF THE DISCLOSURE

Telemetering system for obtaining at a calling station read-out of meter indication at a remote transmitting station, a conventional telephone communication channel with a telephone at each station, initial dialing at the calling station of the transmitting station number, and the audible ringing signal at the transmitting station starting an automatic read-out cycle of the system wherein the meter to be read has two reflecting mirrors at a fixed reference point and on the meter needle, respectively, the incoming ringing signal causing starting of a motor-driven optical scanner for producing an individual audible pulse as each mirror is scanned, and also causing lifting of the transmitting station telephone receiver for transmitting the spaced pulse signals to the calling station telephone, and electrical means at the calling station telephone utilizing the received spaced pulses for starting on the first pulse an indicator motor that is speed-synchronized with the scanning motor, and for stopping the motor on the second pulse for readout of the remote meter indication.

This invention relates to telemeters and telemetering apparatus and methods, and more particularly to improved means and methods for ascertaining the reading of a meter at a remote location and transmitting the meter reading over an ordinary commerical telephone circuit in conventional manner to a control station.

In accordance with the invention, the meter to be read is provided with two small mirrors, one attached to the pointer or index of the meter and the other attached to the face of the meter at an arbitrary position on, or upon an extension of, the scale of the meter. A suitable scanning device comprising, for example, a lamp and a photoconductor or photoelectric cell is arranged to scan the face of the meter upon a signal received over the telephone line in the course of an ordinary telephone call. The scanning path is arranged to pass along the scale of the meter and along an extension of that scale so that the beam from the lamp falls successively upon the two mirrors. When the beam falls upon a mirror the beam is reflected upon the photoconductor, changing the electrical resistance thereof, and activating associated apparatus which sends an audible pulse over the telephone line.

Two such pulses are transmitted from the remote station to the control station. The scanning is carried out at a predetermined rate, preferably at a substantially constant speed, so that the time interval elapsing between the two pulses is a measure of the position of the index of the meter with respect to an arbitrary point, preferably off-scale. Using an off-scale reference point, index and reference point will never coincide and two pulses spaced apart by a measurable time interval will always be produced whatever the reading of the meter. At the control station, there may be provided an indicator capable of showing scale readings corresponding to those shown by the meter at the remote station. The pointer or index of this indicator is kept normally at a position corresponding to the arbitrary position of the mirror on the face of the meter to be read. When the first pulse is received from the remote station, a motor is started which progressively changes the reading of the indicator. When the second pulse is received, the motor is stopped, leaving the indicator with a reading corresponding to the reading of the meter at the remote station.

It will be appreciated, of course, that it is also possible to obtain the reading of the meter from the interval between the pulses in other ways by measuring the time interval between the pulses by means of a watch, clock or stop-watch, by using the pulses to start and stop a counter, etc.

It is an object of the invention to reduce the cost of telemetering over a telephone line.

Another object is to reduce to a minimum the necessary modification of or attachments to a meter in order to enable the meter to be read by telemetric means.

Another object is to improve the accuracy of reading of a meter by telemetric means.

A feature of the invention is the use of a time interval between successive pulses to convey the information as to the position of the pointer or index of the meter at the remote station.

A related feature is the use of relatively sharp pulses so as to more precisely determine the interval between the pulses.

Another feature is the use of small mirrors which are readily attached to a meter and which do not interfere perceptibly with the movement of the pointer or in any way with the normal action of the meter.

Other features, objects and advantages will appear from the following more detailed description of illustrative embodiments of the invention, which will now be given in conjunction with the accompanying drawings.

Figure 1:
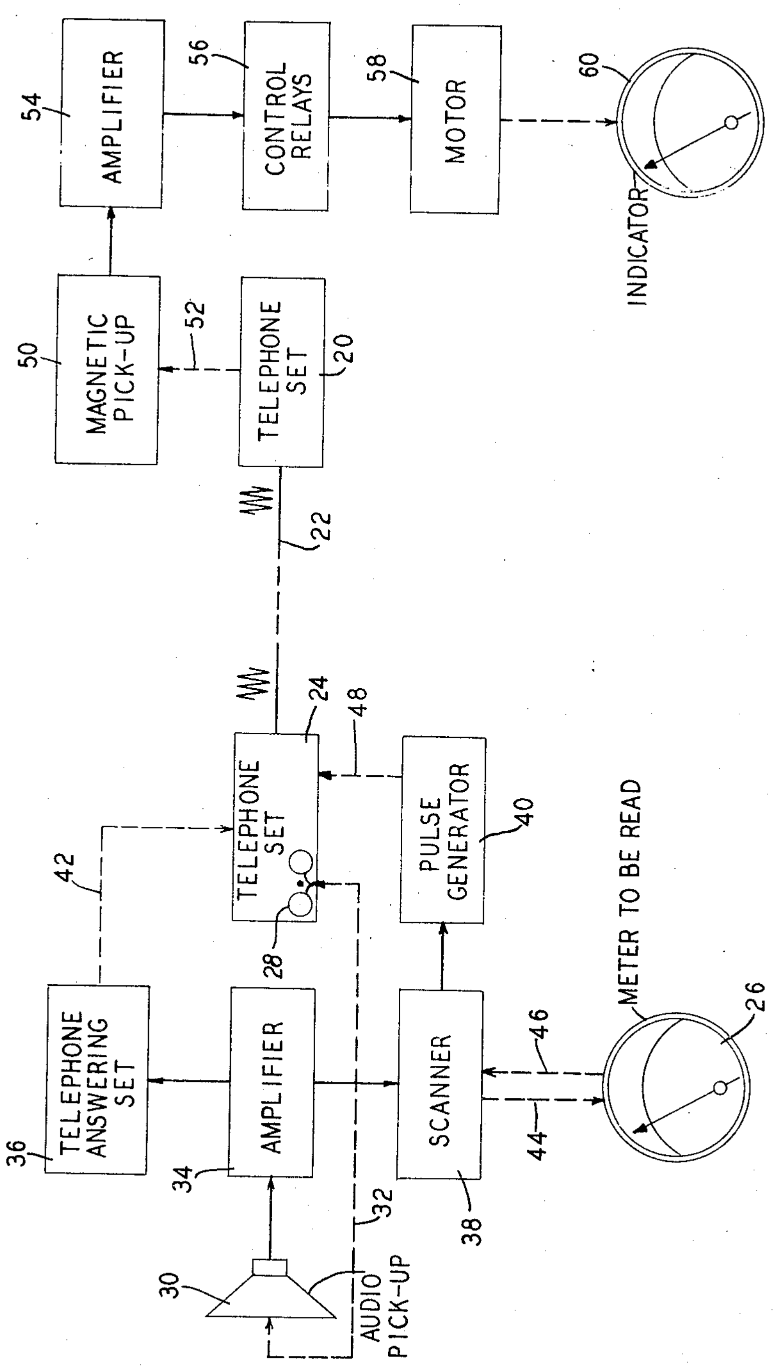
FIG. 1 is a block schematic diagram of a telemetering system embodying the invention.

Referring to FIG. 1, there are shown the principal components of one illustrative embodiment of the invention. A telephone set 20 at a read-out station can be connected over a telephone line 22 in the usual manner to a telephone set 24 at the location of a meter 26 which is to be read by telemetric means. The ringing of the bell 28 in the telephone set 24 actuates an audio pick-up device 30, which in this embodiment is shown as a loud speaker. The audio link from the bell 28 to the speaker 30 is shown schematically by a dotted line 32. The audio output of the speaker 30 is amplified in an amplifier 34 and actuates a telephone answering set 36 which lifts the telephone instrument from its cradle and holds it in the lifted position until the call is ended. The amplified audio output also actuates a scanner 38 which immediately begins to scan the scale of the meter 26. At two points on the scale of the meter 26, the scanner 38 in conjunction with small mirrors attached to the meter 26 actuates a pulse generator 40 to generate in each instance a pulse that is transmitted audibly to the telephone 24 which sends a pulse over the line 22 to the telephone set 20 at the read-out section.

The mechanical linkage which enables the answering set 36 to lift and hold the telephone instrument is represented by a dotted line 42; the scanning beam directed from the scanner 38 to the meter 26 is represented by a dotted line 44 and the returning beam reflected from the meter 26 to the scanner 38 is represented by a dotted line 46. The audio path through the air from the pulse generator 40 to the telephone set 24 is represented by a dotted line 48.

At the read-out station, a pulse received over the telephone line 22 is transmitted through the air to a magnetic pick-up 50 over a path represented by a dotted line 52. The output from the pick-up 50 is amplified in an amplifier 54 and is used to actuate control relays represented by a block 56 to control a motor 58 to drive an indicator 60.

The indicator 60 has a scale corresponding to the scale of the meter 26 to be read. The motor 58 when actuated changes the reading of the indicator 60 with respect to the scale at a rate corresponding to the rate of the scanner 38.

The mirrors on the meter 26 are located one at a reference point, preferably off the scale of the meter 26, and the other on the index or pointer of the meter 26. Between scanning operations, the scanner 38 is arranged to rest at an arbitrary starting position at a point also preferably off scale. Also between scanning operations, the motor 58 is restored by suitable means to a starting position such that the index or pointer of the indicator 60 rests at a position corresponding to the said reference point on the meter 26, which in general will not correspond to the starting position of the scanner 38.

In the scanning operation, the first of two pulses received at the read-out station is used to start the motor 58 and the second pulse is used to stop the motor 58. In this way, the reading of the indicator 60 is changed from the reference reading to a reading corresponding to the reading of the meter 26 at the time of the scanning operation.

Figure 2:
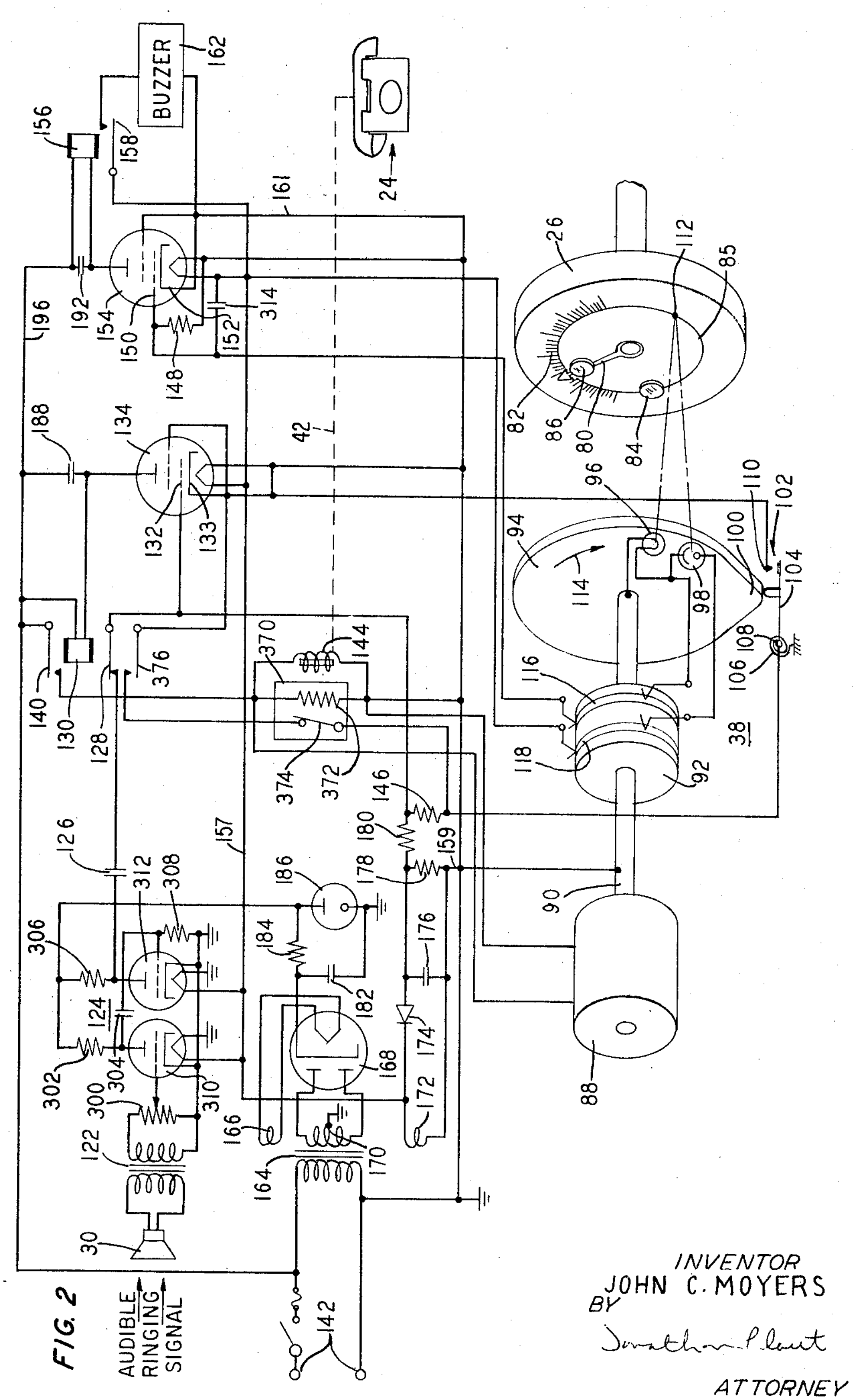
FIG. 2 is a more detailed electro-mechanical schematic diagram of an illustrative embodiment of apparatus at the location of the meter to be read, the embodiment employing control circuits using thermionic tubes and electro-magnetic relays.

FIG. 2 shows in more detail an illustrative form of apparatus at the transmitting station. The meter 26 to be read is shown schematically with centrally pivoted pointer 80 arranged to travel over a scale segment 82, the scale reading clockwise as is customary. Two small mirrors are provided on the face of the meter, comprising a mirror 84 off-scale, preferably near the zero end of the scale, and a mirror 86 on the pointer. The mirrors 84 and 86 preferably are located on a circle 85 concentric with the pivot of the pointer 80.

To read the meter 26 there is shown an illustrative form of the scanner 38 comprising a step-down geared alternating current motor 88 having an output shaft 90 which will revolve at a suitable controlled preferably constant speed of, for example, two revolutions per minute. The shaft 90 carries a number of slip rings, illustrated as mounted upon a drum 92, and a scanning disk 94. Mounted upon the disk 94 are a lamp 96 and a photocell or photoconductor 98 arranged to face the meter 26 and adjusted so that a beam from the lamp 96 falls upon a point on the circle 85 upon which the mirrors 84 and 86 are located, and so that when the beam strikes either of the mirrors in the course of rotation of the shaft 90, the beam is reflected upon the photoconductor 98, causing the member 98 to change from a state of high electrical resistance while not illuminated to a state of relatively very low resistance when illuminated.

At one point on the circumference of the disk 94 there is provided an outwardly extending tab or cam 100 arranged to open a switch 102, the blade 104 of which is mechanically biased, as by means of a coiled spring 106 to provide a normally closed connection between a pair of contactors 108 and 110. When the switch 102 is opened by the cam 100 in the course of revolution of the shaft 90, a control circuit for the motor 88 is broken, thereby stopping the motor with the cam 100 resting upon the switch blade 104. Preferably, the shaft 90 is stopped by the cam 100 with the beam from the lamp 96 falling upon a point such as point 112 on the face of the meter 26 off the scale 82 of the meter, preferably near the maximum reading of the scale. This arrangement of the mirror 84 and the stopping point 112 is advantageous. It provides maximum scanning time upon starting for the scanner to move from the stopping point 112 to the mirror 84, allowing sufficient time for resetting of the read-out device at the receiving station before the mirror 84 is passed for the initial read-out pulse. The scanner then continues just past full scale and stops.

The shaft 90 is shown arranged to turn clockwise, as indicated by an arrow 114, so that when the shaft is rotated from the stopped position shown, the beam from the lamp 96 will fall upon the mirror 84 before it falls upon the mirror 86, and will thereafter be returned to the stopped position at 112. Alternatively, the shaft 90 may be turned counter-clockwise, the beam falling upon the mirrors in the reverse order.

The lamp 96 is shown connected between the shaft 90, which is grounded, and a slip ring 116. The cell 98 is shown connected between a pair of slip rings 116 and 118.

The apparatus shown in FIG. 2 for starting and stopping the motor 88 and for generating telemetric signals to be sent over a telephone line will now be described. The audio pick-up device 30 is shown, which may be a loudspeaker located to pick up sound waves emanating from the telephone bell when the number of the telephone is called in the regular way. The electrical output of the speaker 30 is passed through a suitable transformer 122 to a two-stage amplifier-rectifier type of device 124 which produces one rectified output pulse per cycle of the ringing signal. The train of pulses is transmitted through a capacitor 126 and a normally closed transfer contactor 128 of a relay 130 to the control grid 132 of a thermionic tube 134. The polarity of the pulses is such as to render the grid 132 more positive, thereby causing the tube 134, which is preferably biased on the verge of conduction, to conduct and energize the relay 130 which is serially connected in the anode circuit of the tube. The action of the relay 130 opens the circuit through the contactor 128 and closes a normally open contact by way of a contactor 140 to impress alternating current from a power line 142 across a solenoid 144 which is arranged to lift the telephone instrument from its cradle, thus performing the equivalent of answering the telephone call. The contactor 140 at the same time connects the power line 142 across the motor 88. A normally open contact at a contactor 376 is provided to insure the motor 88 turning sufficiently to allow the cam 100 to close the switch 102 before the telephone instrument is lifted, at which time the signals from the speaker 30 cease to come in as the telephone stops ringing. The closing of the contact by the contactor 376 causes a resistor 146 to be shunted across the grid 132 and cathode 133 of the tube 134 to alter the bias supplied to the tube by rectified current from the power line 142 from a secondary winding 172 and a diode 174, providing a holding bias to maintain the tube conductive.

The closing of the switch 102 completes a parallel connection of the shunt resistor 146 across the grid 132 and cathode 133 of the tube 134, independently of the contactor 376.

In series with the contactor 376 there is provided a normally closed contact through a thermostatic contactor 374 of a time delay relay 370. The relay 370 has a heating resistor 372 which is connected in parallel with the solenoid winding 144 and the motor 88. The resistor 372 delivers heat which causes the contact through the contactor 374 to be broken after the heat has been applied for a predetermined time, preferably just long enough to allow the motor to move the cam 100 off the switch 102. After the circuit is broken at the contactor 374, the relay 370 cools down in a few seconds, ready for a subsequent operation.

The motor 88 thus continues to turn the shaft 90 and when the beam of the lamp 96 falls upon the mirror 84 a low resistance shunt circuit is provided through the photoconductor 98 in parallel with a relatively high resistance of a resistor 148 permanently connected between the control grid 150 and cathode 152 of a thermionic tube 154. The tube 154 is preferably adjusted on the verge of conduction but blocked by grid current self-bias. The shunting of the resistor 148 allows anode current to flow through the tube 154 and conductor 196 to energize a relay 156 to close a normally open contact through a contactor 158 to supply alternating current from the transformer 164 to a buzzer 162 so located as to impress an audible signal upon the transmitter of the telephone and send a signal over the telephone line to the calling telephone. The tube 154 blocks again when the photoconductor 98 ceases to be illuminated.

In a measured interval of time later, indicative of the reading of the meter 26 at the time, the beam falls upon the mirror 86, causing a second buzzer signal to be sent over the telephone line. Thereafter, the shaft 90 continues to turn until the cam 100 again opens the switch 102, restoring the grid 132 of the tube 134 to its original more negative potential, causing the relay 130 to release, stopping the motor 88 with the cam 100 holding the switch 102 open, and returning the telephone instrument to its cradle to end the telephone call and restore the system to a condition ready for a subsequent call.

Power for the amplifier-rectifier 124 as well as for filaments and for biasing potential for the control grid 132 of tube 134 is conveniently taken from the line 142 through a transformer 164. The transformer 164 has three secondary windings of which winding 166 supplies filament current for a full-wave rectifier tube 168. Secondary winding 170 supplies power to the anodes of the tubes 310 and 312 in the amplifier-rectifier 124 by way of the plate circuit of tube 168. The winding 172 supplies filament current to tubes 310, 312, 134 and 154, and power through conductors 157, 159 and 161 to the buzzer 162, as well as the above mentioned direct current biasing potential for tube 134 by way of the diode rectifier 174. The rectified current is smoothed out by filter elements comprising a capacitor 176 and resistors 178 and 180. The anode voltage for the amplifier-rectifier tubes 310 and 312 is smoothed by means of a capacitor 182 and a resistor 184.

The B-voltage impressed upon the anodes of the thermionic tubes 310 and 312 is regulated by a regulator tube 186 connected between ground and the terminal of the resistor 184 remote from the capacitor 182. The tube 186 serves to prevent accidental triggering of tube 134 due to line voltage fluctuations on the power line 142.

The windings of the relays 130 and 156 are provided with shunt capacitors 188 and 192, respectively, to minimize or prevent chattering of the relay.

Additional description of the arrangement of FIG. 2 will now be given. The amplifier-rectifier arrangement 124 is shown as comprising a pair of thermionic triodes 310 and 312, connected to generate an output pulse during each time interval when the grid potential of the tube 310 is positive. When the grid potential of the tube 310 is negative, the anode current of the tube is cut off, causing the anode potential to be relatively high, as determined by the voltage across the regulator tube 186. At this time, a coupling capacitor 304 connected between the anode of tube 310 and the control grid of tube 312 is charged to the voltage of regulator 186. At the same time, the grid of the tube 312 is at ground potential and the tube 312 is conducting, its anode being at a relatively low potential due to the potential drop of the anode current through an anode load resistor 306. The grid potential of the tube 310 is determined by the ringing current passed through the transformer 122 to a potentiometer 300, the movable contact of which can be adjusted so that in the absence of impressed potential in the potentiometer 300 the tube 310 is close to cut-off and on the verge of conduction. When the grid of the tube 310 goes positive, the tube becomes conductive, causing anode current to flow and dropping the anode potential due to anode current flow in an anode load resistor 302. The dropping of the anode potential of tube 310 causes discharge of the coupling capacitor 304. The discharge takes place through the conductive tube 310, putting a negative potential on the control grid of tube 312, cutting off anode current in that tube. The cutting off of the anode current in tube 312 causes the anode potential of that tube to rise, sending a pulse to the capacitor 126 and on to the tube 134 as described above.

Connected between the control grid and the filament of the tube 154 there is provided a smoothing capacitor 314 to reduce the possibility of erratic operation of tube 154 and to store grid-current self-bias potential for tube 154.

Figure 3:
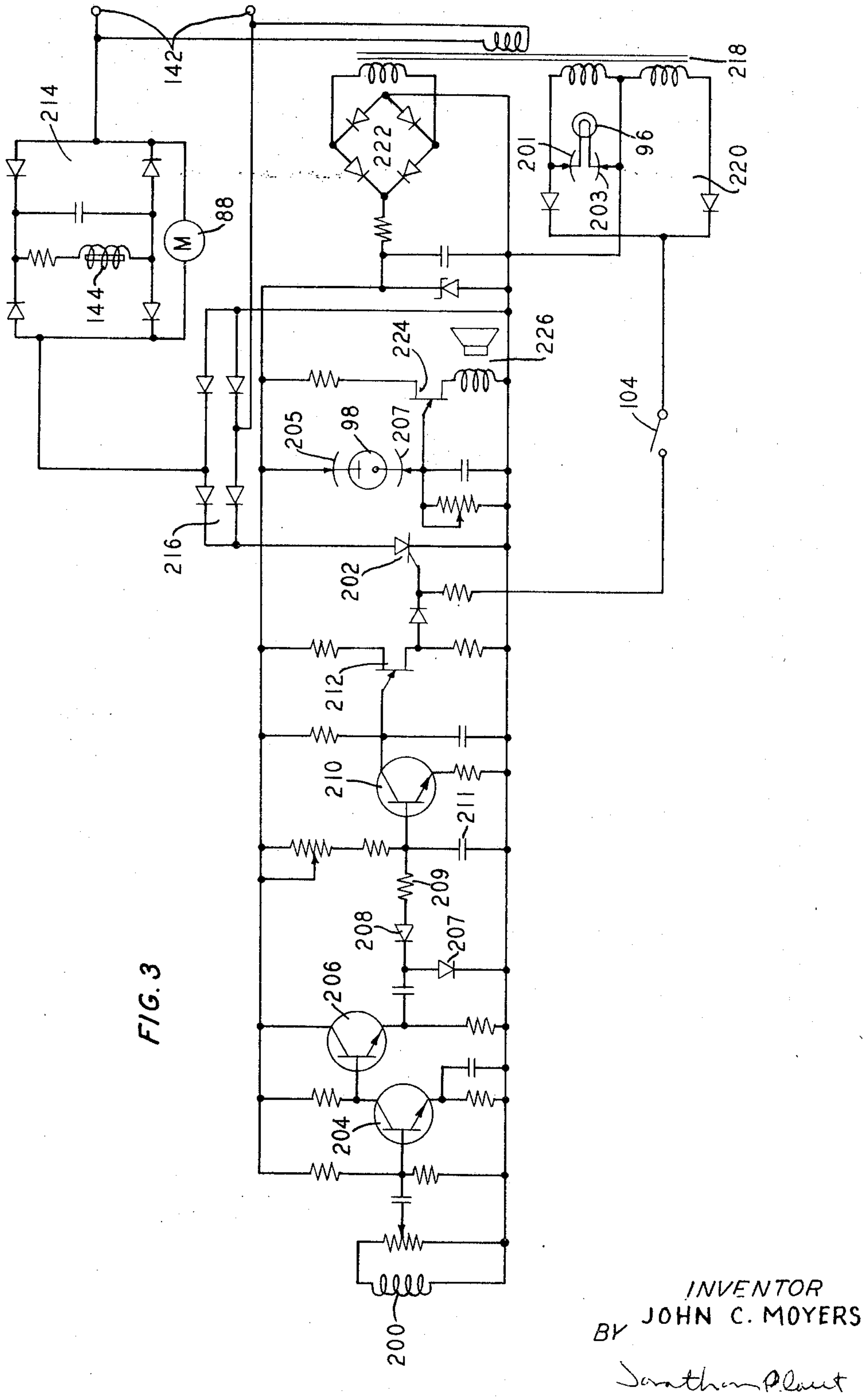
FIG. 3 is an electrical schematic diagram of alternative control circuits for a system like that shown in FIG. 2, using solid state components in place of thermionic tubes and electromagnetic relays.

FIG. 3 shows an alternative embodiment of a transmitter employing solid state components in place of thermionic tubes to provide substantially the same functions as are accomplished by the system shown in FIG. 2.

A magnetic pick-up device 200 is used instead of an audio pick-up to sense the ringing current in the telephone set. The device 200 is preferably mounted immediately beneath the telephone set. The generation of a signal in the pick-up 200 is used to trigger-on a silicon controlled rectifier 202 to complete circuits for energizing the telephone lifting solenoid 144 and the scanning motor 88. The signal from the pick-up 200 acts through a train of solid state components comprising, in the embodiment illustrated, transistors 204 and 206, diodes 207, 208, a resistor 209, a transistor 210, a capacitor 211, and a unijunction transistor oscillator 212.

The signal from the pick-up 200 is amplified by the transistors 204, 206. The alternating current output from the transistor 206 is rectified by the diodes 207, 208, current pulses in one direction being short-circuited through diode 207 while current pulses in the reverse direction charge the capacitor 211 through the diode 208 and the resistor 209. The resistor 209 and the capacitor 211 constitute a filter, the time constant of which is preferably sufficiently long to maintain a rectified signal on the transistor 210 during the period from the instant the telephone receiver is lifted to the time when the motor 88 has moved enough to allow the switch 104 to close. Furthermore, the time constant of the filter is preferably sufficiently long to substantially prevent transient signals, caused when the telephone is hung up, from triggering the transistor 210.

Power for the system of FIG. 3 is conveniently supplied from the commercial power line 142. Rectified current for the solenoid 144 and for the silicon controlled rectifier 202 is supplied by way of first and second full-wave rectifying diode bridges 214, 216. The power for the motor 88, which is preferably an alterating current motor, can by-pass the first bridge 214 and be supplied through bridge 216, which passes alternating current.

To keep the solenoid 144 and motor 88 energized after the switch 104 is closed, a source of holding bias for the control grid of the silicon controlled rectifier 202 is provided by means of a transformer 218 connected across the line 142. This transformer also supplies current to light the lamp 96 and supplies power to the various solid state components, to the photoconductor 98, and to a permanent magnet type loud speaker 226, which latter component generates an audio signal controlled by the photoconducor 98 for transmission over the telephone line to the read-out station.

The holding circuit for the silicon controlled rectifier 202 includes a full-wave rectifier 220 coupled to the transformer 218. The lamp 96 may be lighted by alternating surrent through slip rings 201, 203, conveniently from one-half of a secondary winding of the transformer 218 which supplies the rectifier 220. The circuit of the rectifier 220 is connected to the control terminal of the silicon controlled rectifier 202 by way of the limit switch 104.

Another secondary winding of the transformer 218 is conveniently used to supply a suitable voltage, e.g., 22 volts through a full-wave rectifier bridge 222 to the solid state devices, the photoconductor 98 and the loud speaker 226. The power circuit for the photoconductor 98 includes slip rings 205, 207.

In the course of scanning the meter to be read, when the beam from the lamp 96 is reflected upon the photoconductor 98, the reduction in the resistance of the latter element causes a unijunction transistor oscillator 224 to be energized to send alternating current through the winding of a loud speaker 226 to generate an audible tone which is picked up by the telephone transmitter and is transmitted as tone pulse over the telephone line to the read-out station.

Figure 4:
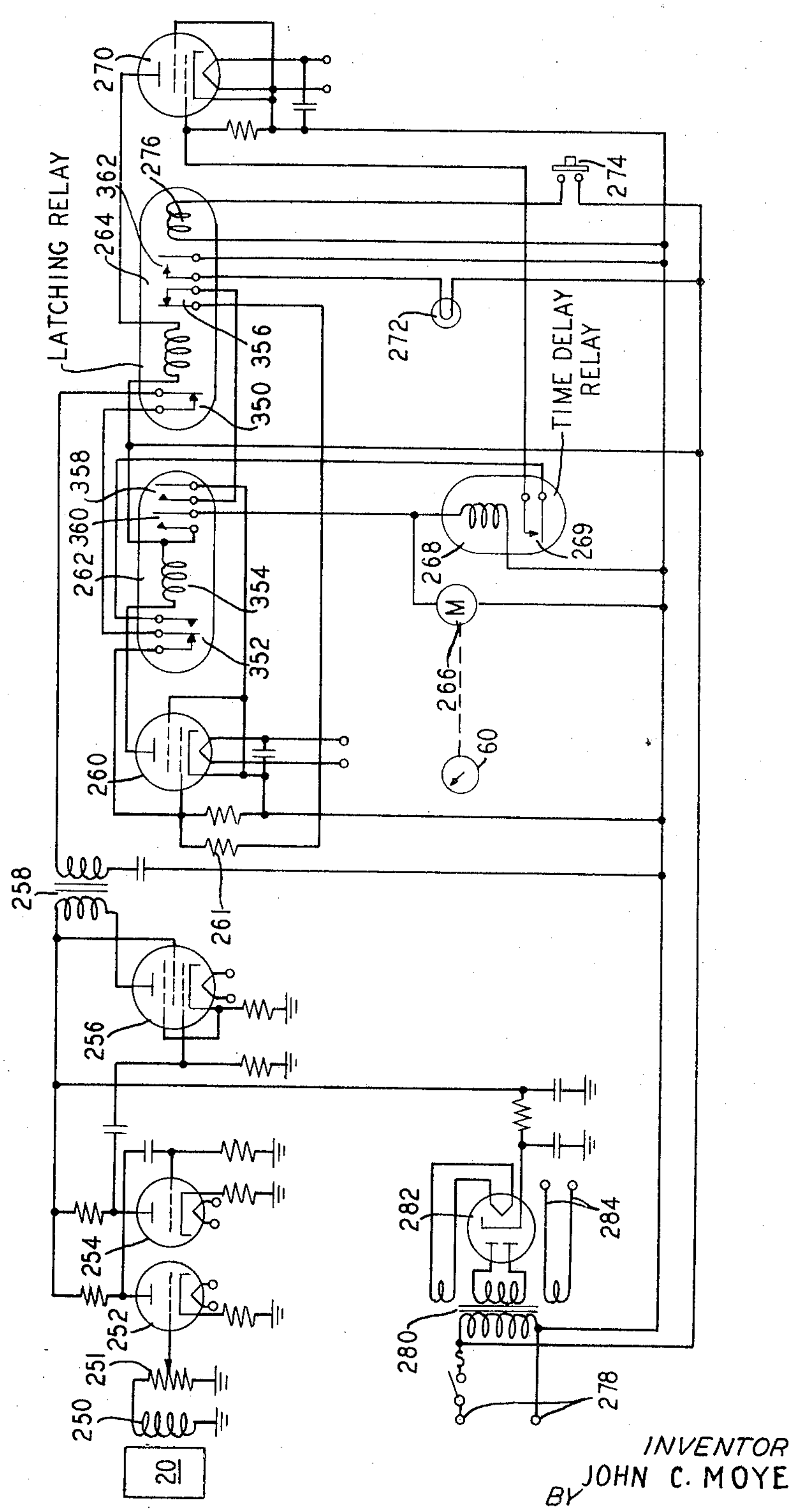
FIG. 4 is an electrical schematic diagram of an illutrative embodiment of read-out apparatus at a control location which may be remote from the location of the meter to be read.

FIG. 4 shows an illustrative embodiment of a read-out station employing thermionic tubes and electromagnetic relays. A magnetic pick-up device 250 is shown which is so located as to pick-up from the telephone line by magnetic coupling the buzzer signal or tone pulse received from the transmitting station. The sensitivity of the read-out station can be adjusted by means of a potentiometer 251 interposed between the magnetic pick-up 250 and the grid 252. The signal picked up is amplified in thermionic tubes 252, 254 and 256 and impressed upon a transformer 258. The first signal of a pair of signals indicating the beginning and end respectively of a telemetric reading is passed from the transformer 258 to the control grid of a thermionic tube 260 over a pair 350 of normally closed contacts in a latching relay 264 and thence over normally closed contacts of a transfer switch 352 in a non-latching relay 262 in series with the first said pair of normally closed contacts.

A generator of sharp pulses, typified by the transmitter buzzer 162, is usually preferable to a substantially sinusoidal tone generator, e.g. 1000 cycles per second, in order to enable the magnetic pick-up 250 suitably located with respect to the circuitry of telephone 20 at the read-out station to discriminate amply against room noise picked up by the telephone set 24 and transmitted over the line 22. If a tone is used, the sensitivity of the receiving system may have to be increased by means of the setting of the potentiometer 251 to a value high enough to cause accidental triggering of the tube 260 by room noise and consequently to produce erroneous meter readings. On the other hand, the sharp electrical impulses generated by the buzzer 162 produce relatively large magnetic impulses in the pick-up 250. This means that the sensitivity setting at the potentiometer 251 can be reduced considerably, thereby accordingly reducing the possibility of accidental triggering of the circuit by ordinary room noise. Under suitable circumstances, however, a tone generator may be used, with frequency-selective filtering if necessary to improve the signal to noise ratio.

The application of the signal to the control grid of the tube 260 renders that tube conductive and passes alternating current from a power line 278 through the anode-cathode path of the tube and through the operating winding 354 of the holding relay 262, which winding is serially connected in that anode-cathode path. Energization of the relay 262 completes a self-holding circuit for the tube 260 by connecting a shunt resistor 261 across between the control grid and the cathode through a circuit through a pair 356 of normally closed contacts in latching relay 264 in series with a pair 358 of normally open contacts in holding relay 262. In the absence of the shunt resistor 261, grid current in the tube 260 holds the grid at a cut-off potential so that the application of the shunt resistor causes the grid to cease to cut off and the tube becomes conductive. Energization of the holding relay 262 breaks the series circuit 350, 352 through which the tube was initially rendered conductive, leaving the self-holding connection in control.

A pair 360 of normally open contacts in the relay 262 upon closing connects an alternating current motor 266 and the winding of a time delay relay 268 across the power line 278, starting the motor and beginning the measurement of a time delay interval by the relay 268. The motor 266 is conveniently synchronized as to speed with the scanning motor 88 by connection to the same alternating current power system. The time delay relay 268 has a pair of normally open contacts which are connected in series with a circuit that is prepared to pass the second signal from the transformer 258 to the control grid of a thermionic tube 270. The circuit goes serially from the transformer 258 through the pair 350 of normally closed contacts in the latching relay 264, the normally open contacts of transfer switch 352 (now closed) in the holding relay 262 and the contacts of the time delay relay 268 to the control grid of the tube 270. Immediately after the first signal at tube 260 when the holding relay is energized, the transfer switch 352 opens the signal transformer circuit to tube 260 and switches the signal transformer to a new circuit for receiving the subsequent second signal. This circuit includes the normally closed contacts 350 of the latching relay 264, the normally open contacts 269 of time delay relay 268, and the tube 270. The purpose of the delay is to prevent the premature firing of the tube 270 before the appearance of the second or scale position signal therefor. As a possible zero meter reading must be provided for, the setting for delayed closing of contacts 269 is within the time required for scanning between the off-scale mirror 84, FIG. 2 (first signal) and the scale zero, or indicator mirror 86 (second signal).

When the proper second signal comes, it fires the tube 270 which in turn energizes the latching relay 264. This relay breaks the pair 350 of normally closed contacts to prevent a second energization of the relay until the circuit has been reset. This same break also interrupts the signal transformer circuit and prevents a second energization of the relay 262 over the series circuit described above involving normally closed transfer contacts 352 in relay 262 and normally closed pair 350 in relay 264. Energization of latching relay 264 breaks the self-holding circuit of relay 262 by opening the contact pair 356, thereby removing the bias resistor 261 and shutting off tube 260 for deenergizing coil 354, releasing relay 262, stopping the motor 266 and removing power from the time delay relay 268 The energization of the relay 264 by closing a normally open contact pair 362, lights a signal lamp 272 indicating that resetting of the circuit is necessary before another call can be made.

To accomplish resetting of the circuit, the relay 264 is provided with a releasing winding 276 which, when energized, releases the latch of the relay 264 by reclosing the holding switch 356, restoring that relay to normal. The winding 276 which is energized by power from the line 278 under control of a push button 274, also reopens the latching relay contacts 362 for turning off the signal lamp 272, thereby indicating completion of resetting.

The motor 266 is normally kept in a radial position which places the indicator 60 (FIG. 1) at an arbitrary starting position. When the motor stops, the indicator 60 shows the reading of the distant meter 26. After the indicator 60 has been read, the motor 266 and indicator 60 can be restored to the arbitrary starting position by any suitable means as will be evident to those skilled in the art.

A transformer 280 is shown connected across the power line 278 to supply filament currents to the various thermionic tubes and to supply rectified current to the anode circuits of the tubes 252, 254 and 256, through a full-wave rectifier tube 282. Filament current is supplied to a pair of conductors 284 which is assumed to be connected in customary manner to the filaments of the tubes 252, 254, 256, 260 and 270, which connections are omitted from the drawing in order to reduce the complexity of the figure.

It will be understood that, whereas the meter to be read has been illustrated herein as of the type in which a pointer moves over a relatively fixed scale member and the pointer is centrally pivoted with respect to the scale, other types of meter can be readily adapted for use with the telemetering apparatus and methods of the invention. For example, the meter may have a relatively fixed index in conjunction with a movable scale bearing member to provide the meter reading in known manner. Furthermore, the movement of the meter need not be about a central pivot, nor need it even be rotary motion, as the scanning device can be made to traverse a suitable path to pass successively over the reflectors and the motion of the indicator at the read-out station can duplicate that of the particular meter to be read.

Scanning means other than electro-optical may be substituted, and in that case, point marking means other than the reflectors illustrated herein may be used.

While the read-out station shown in FIG. 4 employs thermionic tubes and electromagnetic relays, it will be evident to those skilled in the art that solid state components can be used to perform the same functions. However, since usually a single read-out station will serve a plurality of meter locations, the use of solid state components instead of thermionic tubes and electromagnetc relays may not in all cases be economical or otherwise advantageous.

While illustrative forms of apparatus and methods in accordance with the invention have been described and shown herein, it will be understood that numerous changes may be made without departing from the general principles and scope of the invention.

What is claimed is:

1. In a system of telemetry having a conventional telephone communication channel between a transmitting station and a read-out station, in combination, a meter at the transmitting station to be read, said meter having a scale bearing member and an index, first point marking means located at an arbitrary reference point on said scale member bearing, second point marking means located on said index, means responsive to a ringing signal from the read-out station telephone for lifting the transmitting station telephone from its cradle for opening the communication channel and also for energizing scanning means for sensing said point marking means, said scanning means being arranged to scan said meter over a path passing over said first and second point marking means at a predetermined rate, means actuated by said scanning means upon sensing a said point marking means to generate an audible pulse as said scanning means scans each said point marking means successively, thereby defining a time interval between the two audible pulses, which time interval is a measure of the meter reading, the open communication channel transmitting said audible pulses as spaced signal pulses to the telephone at the read-out station, and receiving and measuring means at the read-out station comprising control means actuated in sequence by the respective pulses for starting in response to the first pulse a power operated indicator from a position corresponding to said reference point, and for stopping the indicator in response to the second pulse for the meter read-out, the indicator and scanning means being synchronized as to rate of movement.

2. A system of telemetry in accodrance with claim 1, in which the said reference point on the scale bearing member of the meter to be read is an off-scale point, the reference point at the read-out station indicator is a corresponding off-scale point and time delay means is operable in response to the off-scale first pulse for preventing premature stopping of the indicator by the control means.

3. A system of telemetry in accordance with claim 1 in which the scanning means and the read-out station indicator are driven respectively, by speed synchronized motors, and the control means has interrelated holding and latching means, the holding means being connec'ed to a circuit for producing signals representing the first and second pulses respectively, and being responsive to the first signal for controlling power applied to the indicator motor throughout an indicating cycle, and for transferring the signal circuit to a circuit including the latching means, the latching means being responsive to the second signal for deenergizing the holding means and stopping the indicator motor, and reset means is manually controlled for releasing the latching means and resetting the holding means for subsequently receiving two successive pulses for a new indicating cycle.

4. In a system of telemetry having a conventional telephone communication channel between a transmitting station and a read-out station, in combination, a meter at the transmitting station to be read, said meter having a scale bearing member and an index, first point marking means located at an arbitrary reference point on said scale member bearing, second point marking means located on said index, means responsive to a ringing signal from the read-out station telephone for lifting the transmitting station telephone from its cradle for opening the communication channel, and also for energizing rotary scanning drive means for sensing said point marking means, a limit switch operable by the rotary scanning drive means when said drive means is at a predetermined position in advance of the reference point to disconnect power from said drive means so as to stop said drive means substantially at a starting position, means actuated in response to the ringing signal to move said drive means away from said starting position as well as to connect power to said drive means for completing a scanning cycle terminating at said starting point, said scanning means being arranged to scan said meter over a path passing over said first and second point marking means at a predetermined rate, means actuated by said scanning means upon sensing a said point marking means to generate an audible pulse as such scanning means scans each said point marking means successively, thereby defining a time interval between the two audible pulses, which time interval is a measure of the meter reading, the open communication channel transmitting said audible pulses as spaced signal pulses to the telephone at the read-out station, and means at said read-out station for receiving the spaced pulses and measuring the time interval between them, thereby to determine the meter reading at the transmitting station.

References Cited

UNITED STATES PATENTS

| | | | |
|---|---|---|---|
| 2,007,669 | 7/1935 | Yates | 179—2 RX |
| 2,110,746 | 3/1938 | Tolson | 340—190 X |
| 2,326,200 | 8/1943 | Bristol | 179—2 RX |
| 3,031,652 | 4/1962 | Guerth | 340—206 X |
| 1,765,598 | 6/1930 | McCoy et al. | |
| 3,347,987 | 10/1967 | Chaloupka. | |

ROBERT L. GRIFFIN, Primary Examiner

J. A. BRODSKY, Assistant Examiner

U.S. Cl. X.R.

340—190, 206